(12) United States Patent
Shen et al.

(10) Patent No.: US 11,328,179 B2
(45) Date of Patent: May 10, 2022

(54) INFORMATION PROCESSING APPARATUS AND INFORMATION PROCESSING METHOD

(71) Applicant: FUJITSU LIMITED, Kawasaki (JP)

(72) Inventors: Wei Shen, Beijing (CN); Rujie Liu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 21 days.

(21) Appl. No.: 16/910,245

(22) Filed: Jun. 24, 2020

(65) Prior Publication Data

US 2020/0410290 A1 Dec. 31, 2020

(30) Foreign Application Priority Data

Jun. 25, 2019 (CN) .......................... 201910555707.1

(51) Int. Cl.
*G06K 9/62* (2022.01)
*G06N 3/08* (2006.01)
*G06V 10/40* (2022.01)
*G06V 30/194* (2022.01)

(52) U.S. Cl.
CPC .......... *G06K 9/6256* (2013.01); *G06K 9/627* (2013.01); *G06N 3/08* (2013.01); *G06V 10/40* (2022.01); *G06V 30/194* (2022.01)

(58) Field of Classification Search
None
See application file for complete search history.

(56) References Cited

U.S. PATENT DOCUMENTS

2020/0250497 A1* 8/2020 Peng .................... G06K 9/6277

* cited by examiner

*Primary Examiner* — Leon Flores
(74) *Attorney, Agent, or Firm* — Staas & Halsey LLP

(57) ABSTRACT

An information processing apparatus includes a processor to input each sample image into feature extracting components to obtain at least two features of the sample image, and to cause a classifying component to calculate a classification loss of the sample image based on the at least two features; extract, from each pair of features, a plurality of sample pairs for calculating mutual information between each pair of features; input the plurality of sample pairs into a machine learning architecture corresponding to each pair of features, to calculate an information loss between each pair of features. The processor is to adjust parameters of the feature extracting components, the classifying component and the machine learning architecture by minimizing a sum of classification losses and information losses of sample images in the training set based upon the obtained at least two features of the sample image to calculate the classification losses and the information losses, to obtain the at least two feature extracting components and the classifying component having been trained.

19 Claims, 7 Drawing Sheets

INFORMATION PROCESSING APPARATUS AND INFORMATION PROCESSING METHOD

CROSS-REFERENCE TO RELATED APPLICATIONS

This application claims the priority benefit of Chinese Patent Application No. 2019105557071, filed on Jun. 25, 2019 in the China National Intellectual Property Administration, the disclosure of which is incorporated herein in its entirety by reference.

FIELD

The present disclosure relates to the field of image classification, and particularly to an information processing apparatus and an information processing method for learning more generalized and more robust features, and an information processing apparatus and an information processing method for judging the difficulty of training tasks.

BACKGROUND

In traditional image classification methods, gradient-based optimization methods are used for training. However, the amount of information of the features extracted by using the gradient-based optimization training methods reduces during processing. Therefore, in some cases, not all discriminable features but only features that are easy to discriminate in the image are learned, which makes the classification accuracy of the trained classifier unsatisfactory.

In addition, in the conventional technology, it is difficult to judge the difficulty of training tasks.

SUMMARY

A brief overview of the disclosure is given below in order to provide a basic understanding of certain aspects of the disclosure. However, it should be understood that this overview is not an exhaustive overview of the present disclosure. It is not intended to identify key or important parts of the disclosure, nor is it intended to limit the scope of the disclosure. It is merely to present some concepts of the disclosure in a simplified form as a prelude to the more detailed description that is presented later.

In view of the above problems, an information processing apparatus and an information processing method are provided according to the present disclosure, for solving one or more disadvantages in the conventional technology.

According to an aspect of the present disclosure, there is provided an information processing apparatus including: a classification loss calculating unit configured to input each sample image in a training set into at least two feature extracting components to obtain at least two features of the sample image, and to cause a classifying component to calculate a classification loss of the sample image based on the at least two features; a sample pair extracting unit configured to extract, from each pair of features among at least one pair of features among the at least two features, a plurality of sample pairs for calculating mutual information between the each pair of features; an information loss calculating unit configured to input the plurality of sample pairs into a machine learning architecture corresponding to the each pair of features, to calculate an information loss between the each pair of features; and a joint training unit configured to jointly adjust parameters of the at least two feature extracting components, the classifying component and the machine learning architecture by minimizing the sum of the classification losses and the information losses of all sample images in the training set, to obtain the at least two feature extracting components and the classifying component having been trained.

According to another aspect of the present disclosure, there is provided an information processing device including the at least two feature extracting components and the classifying component having been trained which are obtained by the above information processing apparatus, where the at least two feature extracting components having been trained are configured to extract features from an image to be classified; and the classifying component having been trained is configured to classify, based on the features, the image to be classified.

According to another aspect of the present disclosure, there is provided an information processing apparatus including: a sample pair extracting unit configured to extract, from each pair of features among at least one pair of features among at least two features of a training sample image which are obtained by a classifying device having been trained, a plurality of sample pairs for calculating mutual information between the each pair of features; an information loss calculating unit configured to input the plurality of sample pairs into a machine learning architecture corresponding to the each pair of features, to calculate an information loss between the each pair of features; a training unit configured to adjust parameters of the machine learning architecture by minimizing the sum of the information losses of all training sample images, to obtain the machine learning architecture having been trained; and a training task difficulty judging unit configured to calculate an information loss of each training sample image with the machine learning architecture having been trained, and to judge the difficulty of a training task based on a mean value of the information losses of all training sample images.

According to other aspects of the present disclosure, there are also provided an information processing method corresponding to the above-mentioned information processing apparatus, a computer program code and a computer program product for implementing the method according to the present disclosure.

Other aspects of the embodiments of the present disclosure are given in the following description section, in which preferred embodiments for fully disclosing the embodiments of the present disclosure are explained in detail without placing restrictions thereon.

BRIEF DESCRIPTION OF THE DRAWINGS

The present disclosure can be better understood by referring to the detailed description given below in conjunction with the accompanying drawings, in which the same or similar reference signs are used throughout the drawings to refer to the same or similar parts. The drawings, together with the following detailed description, are incorporated in and form a part of this specification to further illustrate preferred embodiments of the present disclosure and explain the principles and advantages of the present disclosure. In the drawings.

DETAILED DESCRIPTION

Figure 1:
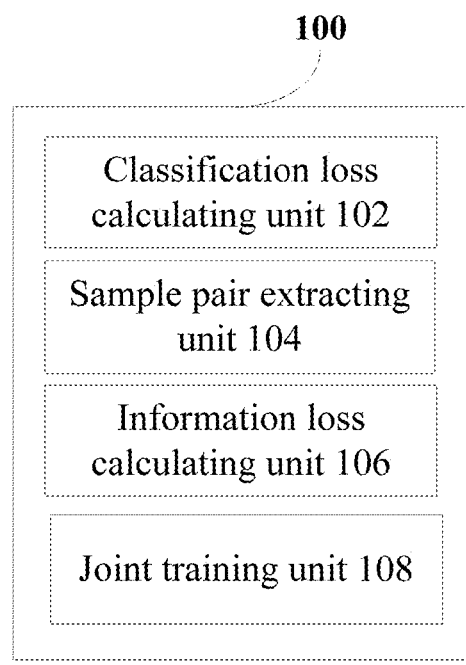
FIG. 1 is a block diagram illustrating a functional configuration example of an information processing apparatus according to an embodiment of the present disclosure.

Hereinafter, exemplary embodiments of the present disclosure are described with reference to the accompanying drawings. For the sake of clarity and conciseness, not all features of a practical implementation are described in the specification. However, it should be understood that in the development of any such practical embodiment, many implementation-specific decisions must be made in order to achieve the developer's specific goals, such as meeting those system- and business-related constraints, and these restrictions may vary depending on the implementation. In addition, it should also be understood that, although development work may be very complex and time-consuming, it is only a routine task for those skilled in the art having the benefit of this disclosure.

Here, it should be noted that in order to avoid obscuring the present disclosure due to unnecessary details, only the device structure and/or processing steps closely related to the solution according to the present disclosure are shown in the drawings, while omitting other details that have little to do with the present disclosure.

Hereinafter, embodiments according to the present disclosure are described in detail with reference to the accompanying drawings.

First, a functional block diagram of an information processing apparatus 100 according to an embodiment of the present disclosure is described with reference to FIG. 1. FIG. 1 is a block diagram showing a functional configuration example of the information processing apparatus 100 according to an embodiment of the present disclosure. As shown in FIG. 1, the information processing apparatus 100 according to an embodiment of the present disclosure includes a classification loss calculating unit 102, a sample pair extracting unit 104, an information loss calculating unit 106, and a joint training unit 108.

The classification loss calculating unit 102 may be configured to input each sample image in a training set into at least two feature extracting components to obtain at least two features of the sample image, and to cause a classifying component to calculate a classification loss of the sample image based on the at least two features.

By way of example and not limitation, the feature extracting component may be a convolutional layer of a convolutional neural network (CNN). Those skilled in the art can understand that the feature extracting component may be in a form other than a convolutional layer of a CNN, which is not described in detail here. In the following, for simplicity, the convolutional layer of a CNN as the feature extracting component is taken as an example for description.

By way of example and not limitation, each of the above features may be a three-dimensional feature map. A three-dimensional feature map at each convolutional layer of the CNN is used as an example, and the feature map reflects the higher-order features of the sample image.

Figure 2:
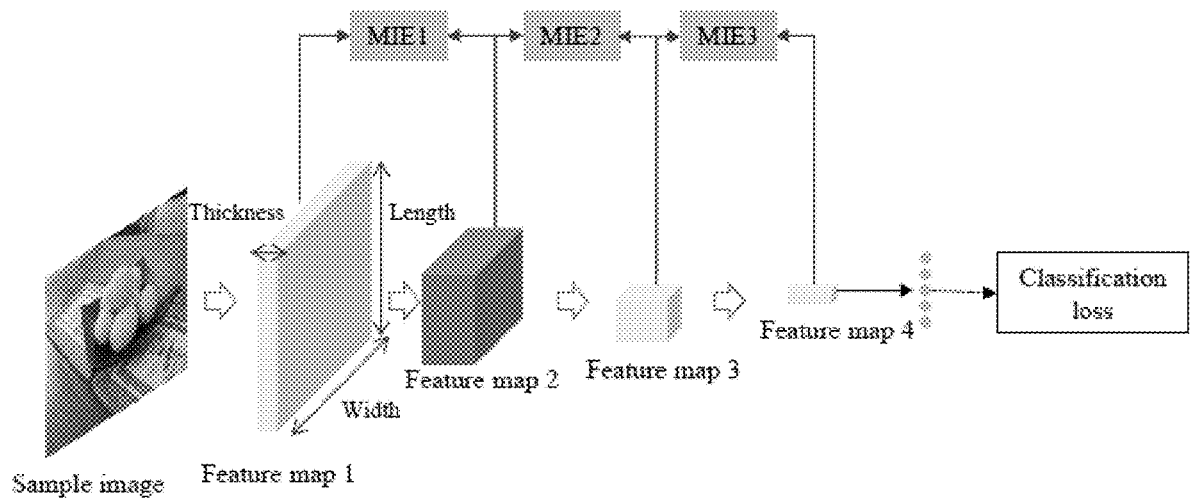
FIG. 2 is a schematic diagram illustrating an exemplary implementation of an information processing apparatus according to an embodiment of the present disclosure.

FIG. 2 is a schematic diagram illustrating an exemplary implementation of the information processing apparatus 100 according to an embodiment of the present disclosure.

Each convolutional layer of the CNN may be used for extracting one feature map of each sample image. Therefore, at least two convolutional layers of the CNN may be used for extracting at least two feature maps of the sample image. In FIG. 2, it is assumed that there are four convolutional layers, and four feature maps are extracted since one feature map of the sample image is extracted by using each convolutional layer. As an example, feature map 1 is first extracted, and then feature map 2, feature map 3, and feature map 4 are extracted. The magnitude relationship between the lengths, widths, and thicknesses of the feature maps shown in FIG. 2 is only a schematic example, and is not intend to limit the magnitude relationship between the lengths, widths, and thicknesses of the feature maps. Since the processing of extracting the feature map of the image by using the convolutional layer of the CNN is a technique known to those skilled in the art, for the sake of brevity, the technical details thereof are not described herein.

As an example, the classifying component calculates a softmax loss as the classification loss based on the features. As an example, a softmax function may be used to calculate the softmax loss based on the feature map 4. Since the processing of calculating the softmax loss by using the softmax function based on the feature map extracted by using the convolutional layer of the CNN is a technique known to those skilled in the art, for the sake of brevity, technical details thereof are not described herein. In addition, those skilled in the art can also think of other ways to calculate the classification loss of the sample image, which are not described here.

Returning to FIG. 1, the sample pair extracting unit 104 may be configured to extract, from each pair of features among at least one pair of features among the at least two features, a plurality of sample pairs for calculating mutual information between the each pair of features.

CNN has multiple convolutional layers that are hierarchical. Generally, there is a loss of information when information is transmitted to a next layer. That is, among different feature maps of the same sample image extracted by different convolutional layers of the CNN, there is a forward information amount transmission loss. For example, in FIG. 2, the amount of information included in feature map 1, feature map 2, feature map 3, and feature map 4 gradually decreases. As an example, the mutual information between each pair of feature maps reflects the correlation between the pair of feature maps.

As an example, the at least one pair of features includes one pair of features extracted by two adjacent feature extracting components among the at least two feature extracting components. With reference to FIG. 2, the at least one pair of features may include a pair of feature maps respectively extracted by two adjacent convolutional layers of CNN. For example, the at least one pair of feature maps may include feature map 1 and feature map 2, or feature map 2 and feature map 3, or feature map 3 and feature map 4. However, the present disclosure is not limited thereto. The at least one pair of features may also be any pair of feature maps among feature maps extracted by different feature extracting components.

As an example, the sample pair extracting unit 104 may be configured to transform a feature with less information in the each pair of features to have the same size as a feature with more information in the each pair of features, to take a sample pair extracted from the same positions in each pair of features having been transformed as a positive sample pair for representing that the mutual information is larger than a predetermined threshold, and to take a sample pair extracted from different positions as a negative sample pair for representing that the mutual information is smaller than or equal to a predetermined threshold, and a plurality of sample pairs include multiple positive sample pairs and multiple negative sample pairs.

Figure 3:
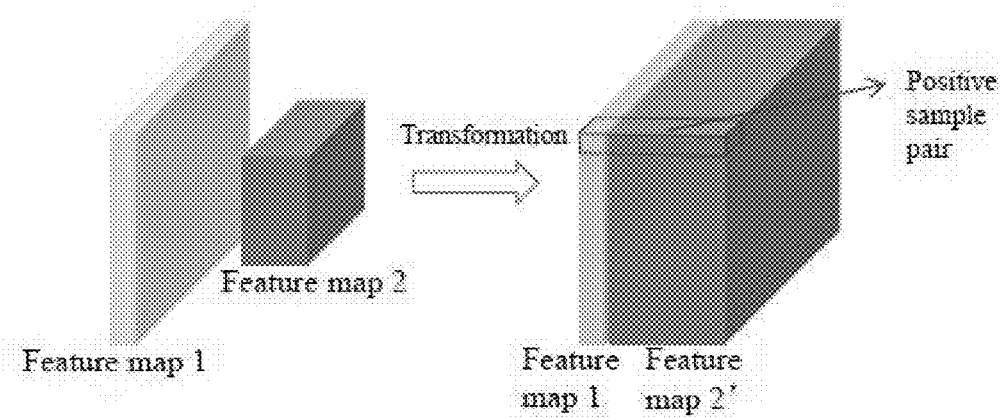
FIG. 3 illustrates an example of transforming a feature image according to an embodiment of the present disclosure.

FIG. 3 illustrates an example of transforming a feature map according to an embodiment of the present disclosure. In FIG. 3, the feature map 1 and the feature map 2 in FIG. 2 are used as examples for transformation. As shown in FIG. 3, the length and the width of feature map 1 are greater than the length and the width of feature map 2. Keeping the length, the width and the thickness of the feature map 1 unchanged, the length and the width of the feature map 2 are transformed to be the same as the length and the width of the feature map 1 by upsampling while the thickness of the feature map 2 is not transformed to obtain the transformed feature map 2'. As shown in FIG. 3, the feature vectors extracted respectively from the same position of the feature map 1 and the feature map 2' are used as a positive sample pair for characterizing that the mutual information is greater than a predetermined threshold. In addition, a sample pair extracted from different positions of the feature map 1 and the feature map 2' are used as a negative sample pair for characterizing that the mutual information is less than or equal to the predetermined threshold. For example, a feature vector is extracted at a position in the feature map 1, and then a position different from the above position in the feature map 1 is randomly selected in the feature map 2', and a feature vector is extracted at the selected position in the feature map 2'. In this way, the feature vector extracted from the feature map 1 and the feature vector extracted from the feature map 2' constitute a negative sample pair. As an example, those skilled in the art may set the predetermined threshold value based on experience. In addition, the predetermined threshold value may also be set in other manners, which is not described in detail here. In addition, those skilled in the art can also think of extracting a plurality of sample pairs in other ways, which are not described in detail here.

As an example, the sample pair extracting unit 104 may be configured to perform the transforming on the feature with less information by upsampling. In addition to upsampling, those skilled in the art can also think of using other methods such as mapping and matching to transform the feature with less information in each pair of features to have the same size as the feature with more information in the each pair of features, which is not described in detail here.

Returning to FIG. 1, the information loss calculating unit 106 may be configured to input the plurality of sample pairs obtained through the sample pair extracting unit 104 into a machine learning architecture corresponding to the each pair of features, to calculate an information loss between the each pair of features.

By way of example and not limitation, the machine learning architecture may be a neural network architecture. For example, the machine learning architecture may be a fully connected neural network. Those skilled in the art can understand that the machine learning architecture may be an architecture other than a neural network architecture, which is not described in detail here. In addition, for clarity of description, the machine learning architecture is sometimes referred to as the mutual information estimation architecture (MIE) in the following.

The calculation of the information loss is described below with reference to FIG. 2. In FIG. 2, for the sake of simplicity, an example is shown in which each pair of feature maps includes a pair of feature maps respectively extracted by two adjacent convolutional layers of CNN. In addition, in FIG. 2, MIE1 is used to calculate the information loss between the feature map 1 and the feature map 2, and MIE2 is used to calculate the information loss between the feature map 2 and the feature map 3, and MIE3 is used to calculate the information loss between the feature map 3 and the feature map 4. Although it is shown in FIG. 2 that the information loss between each pair of adjacent feature maps is calculated through MIE1-MIE3, the present disclosure is not limited thereto. As mentioned above, the pair of feature maps can be any pair of feature maps extracted by different convolutional layers of CNN. Therefore, information loss between only at least one pair of feature maps selected from the feature map 1, the feature map 2, the feature map 3 and the feature map 4 in FIG. 2 may be calculated.

Figure 4A:
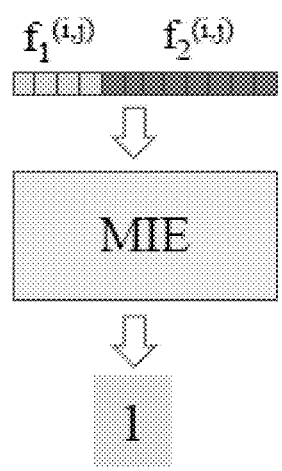
FIGS. 4A and 4B are diagrams illustrating examples of inputs and outputs of a mutual information estimation architecture according to an embodiment of the present disclosure.
Figure 4B:
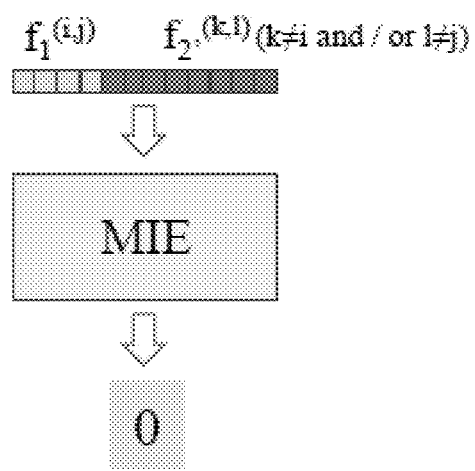

FIGS. 4A and 4B are diagrams showing examples of inputs and outputs of a mutual information estimation architecture according to an embodiment of the present disclosure. In FIGS. 4A and 4B, the feature map 1 and the feature map 2' in FIG. 3 are used as an example for description. In FIG. 4A, j) represents a feature vector extracted along the thickness direction from an i-th position in the width direction and a j-th position in the length direction in the feature map 1, $f_2(i, j)$ represents a feature vector extracted along the thickness direction from an i-th position in the width direction and a j-th position in the length direction of the feature map 2', that is, $f_1(i, j)$ and $f_2(i, j)$ represents a positive sample pair. The positive sample pair is input into the MIE, and parameters such as parameters of the MIE are adjusted during the training process so that the output of the MIE is 1. In FIG. 4B, j) also represents the feature vector extracted along the thickness direction from the i-th position in the width direction and the j-th position in the length direction of the feature map 1, and $f_2(k, l)$ represents a feature vector extracted along the thickness direction from a k-th position in the width direction and a l-th position in the length direction of the feature map 2', where $k \neq i$ and/or $l \neq j$, that is, $f_1(i, j)$ and $f_2(k, l)$ represent a negative sample pair. The negative sample pair is input into the MIE, and parameters such as parameters of the MIE are adjusted during the training process so that the output of the MIE is 0.

As an example, the information loss between each pair of feature maps may be calculated by the following Equation (1):

$$L_d = -(\log(p_1) + \log(1-p_0)) \quad (1)$$

In Equation (1), $p_0$ is the probability that the output of the MIE is 0, and $p_1$ is the probability that the output of the MIE is 1.

The joint training unit 108 may be configured to perform joint training in a manner that a sum of classification losses and information losses for all sample images in the training set is minimized, to adjust the parameters of the at least two feature extracting components, the classifying components, and the machine learning architecture to obtain the at least two feature extracting components and the classifying component having been trained.

As an example, the joint training unit 108 iteratively performs back propagation in a manner that the sum of the classification losses and the information losses of all sample images are minimized to update the parameters of the at least two feature extracting components, the classifying component, and the machine learning architecture. The iteration ends when the conditions are met, thereby obtaining the at least two feature extracting components, the classifying components, and machine learning architecture having been trained.

In the conventional technology, taking the classifier as a CNN as an example, if a training set includes a white cat and a black dog, when training the classifier by using such a training set, the color information (for example, black and white) and shape information (for example, the shape of the cat and the shape of the dog) are extracted by the first convolutional layer. However, due to the forward information amount transmission loss between the convolutional layers, the amount of information in the feature map extracted by subsequent convolutional layers is continuously decreasing. In the last convolutional layer, it is possible that only the color information is retained. Therefore, the classifier may only learn to discriminate between black and white, and ignore the specific shape characteristics of the cat and the dog. When the test data includes only a black cat, the classifier may make a wrong judgment and mistake the cat for a dog. Therefore, the classifier only learns to discriminate categories by color, and ignores other potential features of each category.

In the information processing apparatus 100 according to the embodiment of the present disclosure, the mutual information between the features extracted by different feature extracting components is calculated and maximized, and the information loss between the feature extracting components is reduced, so that the classifying component can obtain more discriminative features and learn more generalized and more robust features, thus improving the classification accuracy. Taking the training set including a white cat and a black dog as an example, in the information processing apparatus 100 according to the embodiment of the present disclosure, the first feature extracting component extracts at least color information (for example, black and white) and shapes information (for example, the shape of the cat and the shape of the dog). Since the loss of information between feature extracting components can be reduced, the feature map extracted by a feature extracting component subsequent to the first feature extracting component retains the above-mentioned color information and shape information, thereby learning more generalized, more robust features to further improve classification accuracy.

Corresponding to the above-mentioned embodiment of the information processing apparatus, an embodiment of an information processing method is further provided according to the present disclosure.

Figure 5:
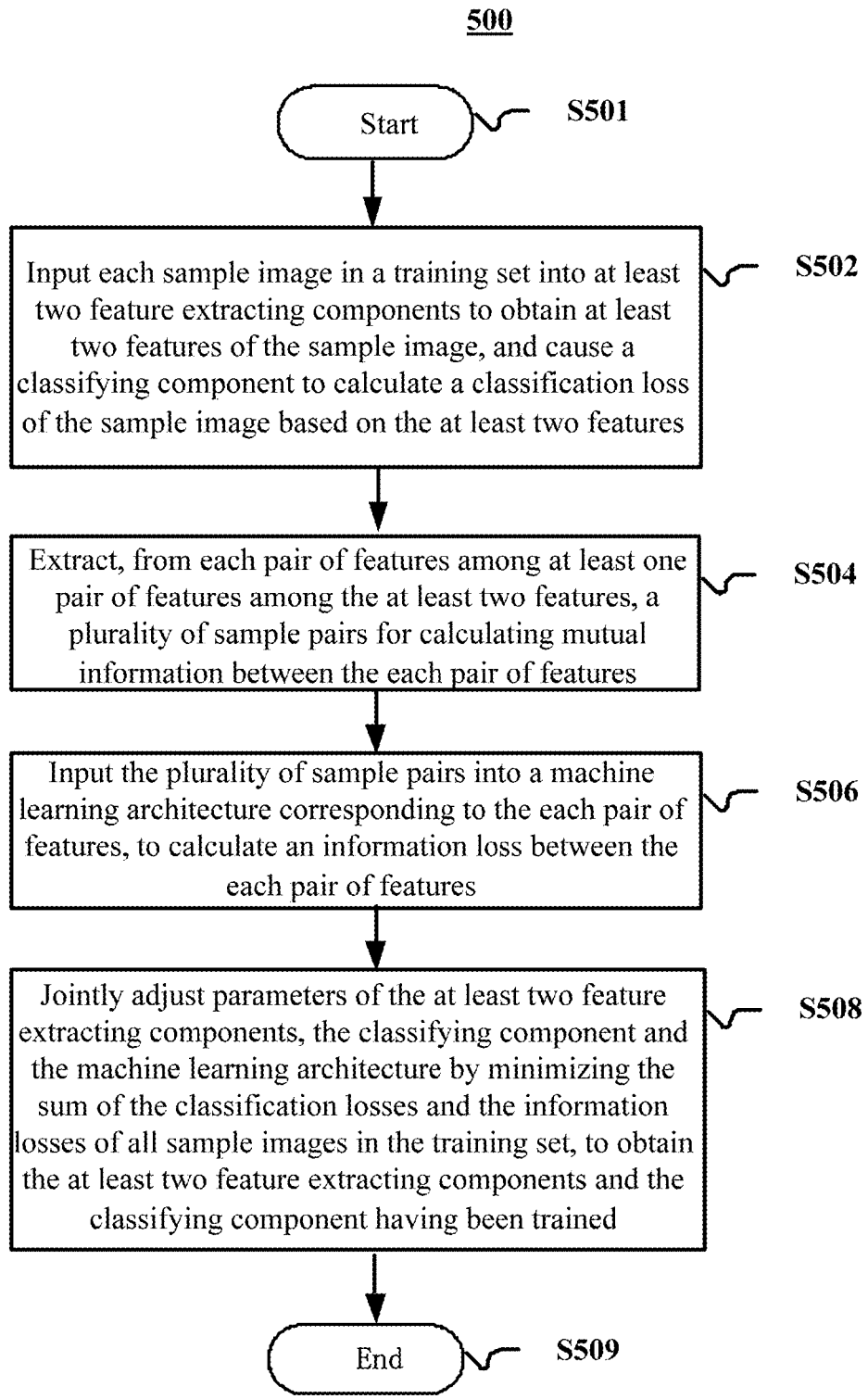
FIG. 5 is a flowchart illustrating a flow example of an information processing method according to an embodiment of the present disclosure.

FIG. 5 is a flowchart illustrating a flow example of an information processing method 500 according to an embodiment of the present disclosure.

As shown in FIG. 5, the information processing method 500 according to an embodiment of the present disclosure includes a classification loss calculating step S502, a sample pair extracting step S504, an information loss calculating step S506, and a joint training step S508.

The information processing method 500 according to an embodiment of the present disclosure starts at S501.

In the classification loss calculating step S502, each sample image in a training set is inputted into at least two feature extracting components to obtain at least two features of the sample image, and the classifying component is caused to calculate a classification loss of the sample image based on the at least two features.

As an example, the feature extracting component may be a convolutional layer of a CNN.

As an example, each feature may be a three-dimensional feature map.

For the description of the feature extracting components and features, reference may be made to the description of the classification loss calculating unit 102 in the apparatus embodiment and FIG. 2, and the description is not repeated here.

As an example, in the classification loss calculating step S502, the classifying component calculates a softmax loss as the classification loss based on the features.

In the sample pair extracting step S504, a plurality of sample pairs for calculating mutual information between the each pair of features are extracted from each pair of features among at least one pair of features among the at least two features.

As an example, the at least one pair of features includes one pair of features extracted by two adjacent feature extracting components among the at least two feature extracting components.

As an example, in the sample pair extracting step S504, a feature with less information in the each pair of features is transformed to have the same size as a feature with more information in the each pair of features, a sample pair extracted from the same positions in each pair of features having been transformed is taken as a positive sample pair for representing that the mutual information is larger than a predetermined threshold, and a sample pair extracted from different positions is taken as a negative sample pair for representing that the mutual information is smaller than or equal to a predetermined threshold. The plurality of sample pairs include multiple positive sample pairs and multiple negative sample pairs.

As an example, in the sample pair extracting step S504, transforming is performed on the feature with less information by upsampling.

For the description of the sample pair and the transforming performed on the feature map, reference may be made to the description of the sample pair extracting unit 104 in the apparatus embodiment and FIG. 3, and the description is not repeated here.

In the information loss calculating step S506, the plurality of sample pairs are inputted to a machine learning architecture corresponding to the each pair of features, to calculate an information loss between the each pair of features.

As an example, the machine learning architecture may be a neural network architecture.

For the description of the machine learning architecture and the calculation of the information loss between a feature pair, reference may be made to the description of the information loss calculating unit 106 in the apparatus embodiment and FIGS. 4A and 4B, and the description is not repeated here.

In the joint training step S508, parameters of the at least two feature extracting components, the classifying components, and the machine learning architecture are jointly adjusted by minimizing the sum of the classification losses and the information losses of all sample images in the training set, to obtain the at least two feature extracting components and the classifying component having been trained.

As an example, in the joint training step S508, back propagation is iteratively performed in a manner that the sum of the classification losses and the information losses of all sample images are minimized to update parameters of the at least two feature extracting components, the classifying component, and the machine learning architecture. The iteration ends when the conditions are met, thereby obtaining the at least two feature extracting components, the classifying component, and machine learning architecture having been trained.

The information processing method 500 according to an embodiment of the present disclosure ends at S509.

In the information processing method 500 according to the embodiment of the present disclosure, the mutual information between the features extracted by different feature extracting components is calculated and maximized, and the information loss between the feature extracting components is reduced, so that the classifying component can obtain more discriminative features and learn more generalized and more robust features, thus improving the classification accuracy.

An information processing device for classifying an image to be classified is provided according to the present disclosure. Hereinafter, in order to distinguish from the information processing apparatus 100, an information processing device for classifying an image to be classified is referred to as a classifying device. The classifying device includes the at least two feature extracting components and the classifying component having been trained which are obtained by the information processing apparatus 100. In the classifying device, the at least two feature extracting components having been trained may be configured to extract features from an image to be classified, where the features may be three-dimensional feature maps. The classifying component having been trained may be configured to classify the image to be classified based on the features.

In the information processing apparatus 100 according to the embodiment of the present disclosure, the loss of information between features extracted by different feature extracting components is reduced, so that the classifying component can obtain more discriminative features and learn more generalized and more robust features, so the above classifying device can improve classification accuracy.

Corresponding to the above-mentioned embodiment of the information processing apparatus for classifying an image to be classified, an embodiment of an information processing method is further provided according to the present disclosure.

Hereinafter, in order to distinguish from the information processing method 500, an information processing method for classifying an image to be classified is referred to as a classification method. In this classification method, the at least two feature extracting components having been trained which are obtained through the information processing method 500 are used to extract features from the image to be classified, and the classifying component having been trained which are obtained through the information processing method 500 is used to classify the image to be classified based on the features.

In the information processing method 500 according to the embodiment of the present disclosure, the loss of information between features extracted by different feature extracting components is reduced, so that the classifying component can obtain more discriminative features and learn more generalized and more robust features, so the above classification method can improve classification accuracy.

Figure 6:
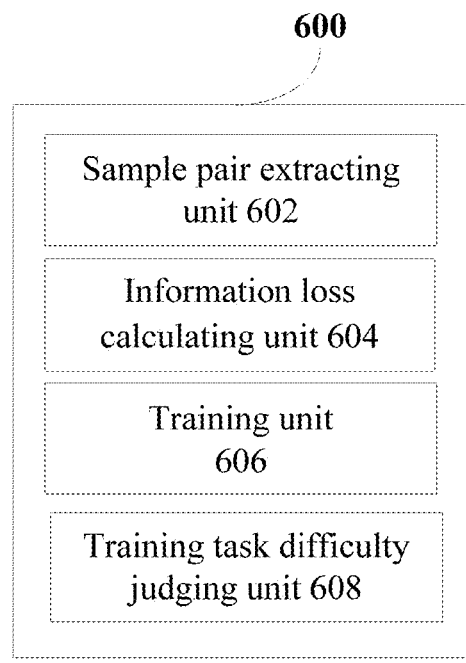
FIG. 6 is a block diagram illustrating a functional configuration example of an information processing apparatus according to another embodiment of the present disclosure.

An information processing apparatus 600 for judging the difficulty of a training task is further provided according to the present disclosure. FIG. 6 is a block diagram illustrating a functional configuration example of the information processing apparatus 600 according to an embodiment of the present disclosure. As shown in FIG. 6, the information processing apparatus 600 according to an embodiment of the present disclosure includes a sample pair extracting unit 602, an information loss calculating unit 604, a training unit 606, and a training task difficulty judging unit 608.

The sample pair extracting unit 602 may be configured to extract, from each pair of features among at least one pair of features among at least two features of a training sample image which are obtained by a classifying device having been trained, a plurality of sample pairs for calculating mutual information between the each pair of features.

As an example, the classifying device for classification is trained by all given training sample images, thereby obtaining a classifying device having been trained. As an example, the classifying device may be a CNN. Those skilled in the art can understand that the classifying device may be in a form other than CNN. The classifying device may extract features from the training sample image, for example, may use a convolutional layer of the CNN to extract the features of the training sample image. In the following, for simplicity, the classifying device being a CNN is taken as an example for description.

As an example, each of the above features may be a three-dimensional feature map. Each convolutional layer of the CNN may be used to extract one feature map of each training sample image. Therefore, at least two convolutional layers of the CNN may be used to extract at least two feature maps of each training sample image. In addition, it is assumed that after the classifying device is trained, the classification accuracy of the classifying device meets the expected requirements, for example, the classification accuracy is greater than or equal to 90%. If the classification accuracy does not meet the expected requirements, the network size of the CNN may be increased that than the expected requirements are met.

For specific examples of the features, reference may be made to the description with reference to FIG. 2 in the embodiment of the information processing apparatus 100, which is not repeated here.

CNN has multiple convolutional layers that are hierarchical. Generally, there is a loss of information when information is transmitted to a next layer. That is, among different feature maps of the same sample image extracted by different convolutional layers of the CNN, there is a forward information amount transmission loss. As an example, the mutual information between each pair of feature maps reflects the correlation between the pair of feature maps.

As an example, the at least one pair of features includes adjacent features among the features obtained by the classifying device having been trained. However, the present disclosure is not limited thereto. Alternatively, the at least one pair of features may be any pair of feature maps among the features obtained by the classifying device having been trained.

As an example, the sample pair extracting unit 602 may be configured to transform a feature with less information in the each pair of features to have the same size as a feature with more information in the each pair of features, to take a sample pair extracted from the same positions in each pair of features having been transformed as a positive sample pair for representing that the mutual information is larger than a predetermined threshold, and to take a sample pair extracted from different positions as a negative sample pair for representing that the mutual information is smaller than or equal to a predetermined threshold. The plurality of sample pairs include multiple positive sample pairs and multiple negative sample pairs.

As an example, the sample pair extracting unit 602 may be configured to perform the transforming on the feature with less information by upsampling. In addition to upsampling, those skilled in the art can also think of using other methods such as mapping and matching to transform the feature with less information in each pair of features to have the same size as the feature with more information in the each pair of features, which is not described in detail here.

For the description of the sample pairs and the performing transforming on the feature map, reference may be made to the description about the sample pair extracting unit 104 and FIG. 3, and the description is not repeated here.

The information loss calculating unit 604 may be configured to input of the plurality of sample pairs into a machine learning architecture corresponding to the each pair of features, to calculate an information loss between the each pair of features.

By way of example and not limitation, the machine learning architecture may be a neural network architecture. For example, the machine learning architecture may be a fully connected neural network. Those skilled in the art can understand that the machine learning architecture may be an architecture other than a neural network architecture, which is not described in detail here.

For a description of calculating the information loss between the each pair of features, reference may be made to the description about the information loss calculating unit 104 and
FIGS. 4A and 4B, and the description are not repeated here.

The training unit 606 may be configured to adjust parameters of the machine learning architecture by minimizing the sum of the information losses of all training sample images, to obtain the machine learning architecture having been trained.

As an example, the training unit 606 updates the parameters of the machine learning architecture by iteratively performing back-propagation in a manner that the sum of the information losses of all training sample images are minimized. The iteration ends when the conditions are met, thereby obtaining the machine learning architecture having been trained. It is to be noted that in the training unit 606, only the parameters of the machine learning architecture are adjusted, and the parameters of the classifying device having been trained are kept unchanged.

The training task difficulty judging unit 608 may be configured to calculate the information loss of each training sample image with the machine learning architecture having been trained, and to judge the difficulty of a training task based on a mean value of the information losses of all the training sample images.

As an example, all training sample images are inputted into the classifying device having been trained and the machine learning architecture having been trained to calculate the information loss of each training sample image, and a mean value of the information losses of all the training sample images is calculated. If the mean value is greater than a predetermined threshold, it means that only a small amount of information is needed to achieve a higher classification accuracy. Therefore, it is determined that the training task is simple. Otherwise, if the mean value is less than or equal to the predetermined threshold, it means that more information is needed to achieve a higher classification accuracy. Therefore, it is determined that the training task is difficult.

From the above description, it can be learned that the information processing apparatus 600 according to the embodiment of the present disclosure can easily judge the difficulty of the image classification training task according to the mean value of the information losses of all the training sample images.

Corresponding to the above-mentioned embodiment of the information processing apparatus, an embodiment of an information processing method for judging the difficulty of a training task is further provided according to the present disclosure.

Figure 7:
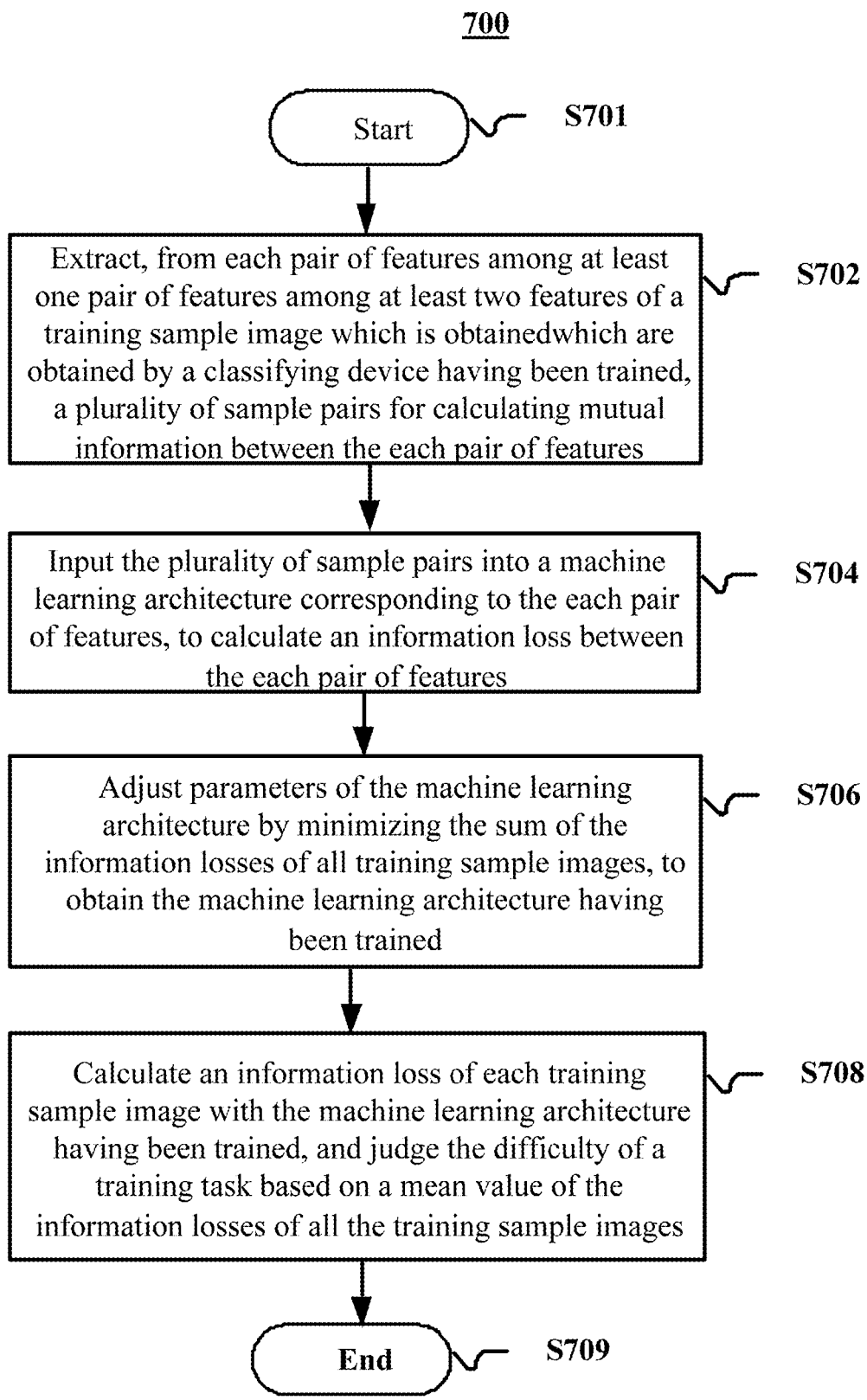
FIG. 7 is a flowchart illustrating a flow example of an information processing method according to another embodiment of the present disclosure.

FIG. 7 is a flowchart illustrating a flow example of an information processing method 700 according to an embodiment of the present disclosure.

As shown in FIG. 7, the information processing method 700 according to an embodiment of the present disclosure includes a sample pair extracting step S702, an information loss calculating step S704, a training step S706, and a training task difficulty judging step S708.

The information processing method 700 according to an embodiment of the present disclosure starts at S701.

In the sample pair extracting step S702, a plurality of sample pairs for calculating mutual information between each pair of features are extract from the each pair of features among at least one pair of features among at least two features of a training sample image which are obtained by a classifying device having been trained.

As an example, the classifying device may be a CNN. Those skilled in the art can understand that the classifying device may be in a form other than CNN.

As an example, each of the above features may be a three-dimensional feature map.

For a detailed description of the classifying device and the features, reference may be made to the description of the sample pair extracting unit 602 in the apparatus embodiment, and the description is not repeated here.

As an example, the mutual information between each pair of feature maps reflects the correlation between the pair of feature maps.

As an example, the at least one pair of features includes adjacent features among the features obtained by the classifying device having been trained. However, the present disclosure is not limited thereto. Alternatively, the at least one pair of features may be any pair of feature maps among the features obtained by the classifying device having been trained.

As an example, in the sample pair extracting step S702, a feature with less information in the each pair of features may be transformed to have the same size as a feature with more information in the each pair of features. A sample pair extracted from the same positions in each pair of features having been transformed is taken as a positive sample pair for representing that mutual information is larger than a predetermined threshold, and a sample pair extracted from different positions is taken as a negative sample pair for representing that the mutual information is smaller than or equal to a predetermined threshold. The plurality of sample pairs include multiple positive sample pairs and multiple negative sample pairs.

As an example, in the sample pair extracting step S702, transforming may be performed on the feature with less information by upsampling. In addition to upsampling, those skilled in the art can also think of using other methods such as mapping and matching to transform the feature with less information in each pair of features to have the same size as the feature with more information in the each pair of features, which is not described in detail here.

For the description of the sample pair and the transforming the feature map, reference may be made to the description about the sample pair extracting unit 104 and FIG. 3, and the description is not repeated here.

In the information loss calculating step S704, a plurality of sample pairs may be inputted into a machine learning architecture corresponding to the each pair of features, to calculate an information loss between the each pair of features.

By way of example and not limitation, the machine learning architecture may be a neural network architecture. For example, the machine learning architecture may be a fully connected neural network. Those skilled in the art can understand that the machine learning architecture may be an architecture other than a neural network architecture, which is not described in detail here.

For a description of calculating the information loss between each pair of features, reference may be made to the description about the information loss calculating unit 104 and FIGS. 4A and 4B, and the description is not repeated here.

In the training step S706, parameters of the machine learning architecture are adjusted by minimizing the sum of the information losses of all training sample images, to obtain the machine learning architecture having been trained.

As an example, in the training step S706, back propagation is iteratively performed to update the parameters of the machine learning architecture in a manner that the sum of the information losses of all training sample images are minimized. The iteration ends when the conditions are met, thereby obtaining the machine learning architecture having been trained. It is to be noted that in the training step S706, only the parameters of the machine learning architecture are adjusted, and the parameters of the classifying device having been trained are kept unchanged.

In the training task difficulty judging step S708, an information loss of each training sample image may be calculated with the machine learning architecture having been trained, and the difficulty of a training task may be judged based on a mean value of the information losses of all the training sample images.

As an example, all training sample images are inputted into the classifying device having been trained and the machine learning architecture having been trained to calculate the information loss of each training sample image, and a mean value of the information losses of all the training sample images is calculated. If the mean value is greater than a predetermined threshold, it means that only a small amount of information is needed to achieve a higher classification accuracy. Therefore, it is determined that the training task is simple. Otherwise, if the mean value is less than or equal to the predetermined threshold, it means that more information is needed to achieve a higher classification accuracy. Therefore, it is determined that the training task is difficult.

The information processing method 700 according to an embodiment of the present disclosure ends at S709.

From the above description, with the information processing method 700 according to the embodiment of the present disclosure, the difficulty of the image classification training task can be easily judged according to the mean value of the information losses of all the training sample images.

It should be noted that although the information processing apparatus and the information processing apparatus method according to the embodiments of the present disclosure are described above, this is merely an example and not a limitation, and those skilled in the art may modify the above embodiments according to the principles of the present disclosure, such as that functional modules and operations in the various embodiments may be added, deleted, combined, etc., and such modifications fall within the scope of the present disclosure.

In addition, it should also be noted that the method embodiment here corresponds to the above-mentioned apparatus embodiment, so the content that is not described in detail in the method embodiment can be referred to the description of the corresponding part in the apparatus embodiment, and the description is not repeated here.

In addition, the present disclosure also provides a storage medium and a program product. The storage medium and the machine-executable instructions in the program product according to the embodiments of the present disclosure may be configured to execute the above-mentioned information processing method, so for the content that is not described in detail herein, refer to the description of the corresponding section previously, which is not repeated here.

Accordingly, a storage medium for carrying the above-mentioned program product including machine-executable instructions is also included in the disclosure of the present disclosure. The storage medium includes, but is not limited to, a floppy disk, an optical disk, a magneto-optical disk, a memory card, a memory stick, and the like.

It should also be noted that the series of processes and apparatus described above may also be implemented by software and/or firmware. When implemented by software and/or firmware, a program constituting the software is installed from a storage medium or a network to a computer having a dedicated hardware structure, for example, a general-purpose personal computer 800 shown in FIG. 8. The computer is installed with various programs and can perform various functions and so on.

Figure 8:
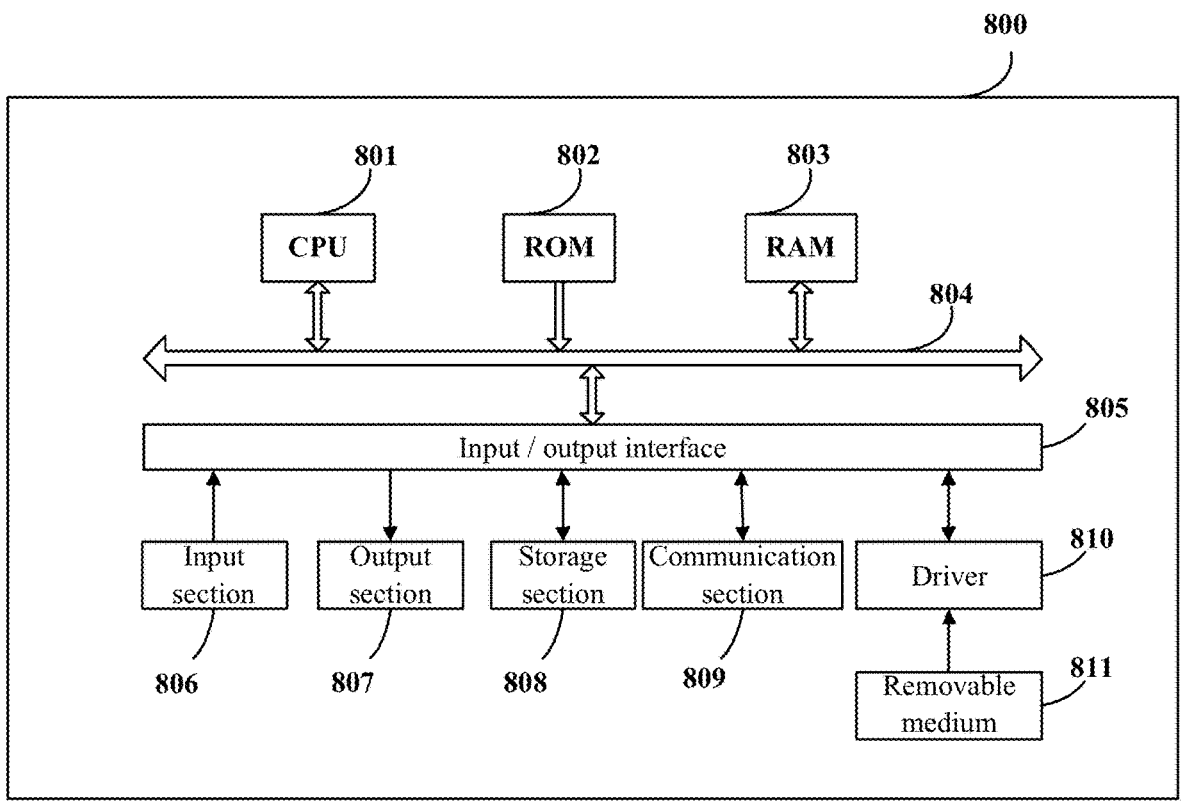
FIG. 8 is a block diagram illustrating an example structure of a personal computer that can be adopted in an embodiment of the present disclosure.

In FIG. 8, a central processing unit (CPU) 801 performs various processes according to a program stored in a read-only memory (ROM) 802 or a program loaded from a storage section 808 to a random access memory (RAM) 803. In the RAM 803, data required when the CPU 801 executes various processes and the like is also stored as necessary.

The CPU 801, ROM 802, and RAM 803 are connected to each other via a bus 804. An input/output interface 805 is also connected to the bus 804.

The following components are connected to the input/output interface 805: the input section 806, which includes a keyboard, a mouse, etc.; the output section 807, which includes a display, such as a cathode ray tube (CRT), a liquid crystal display (LCD), and speakers; the storage section 808, which includes a hard disk and the like; and the communication section 809, which includes a network interface card such as a LAN card, a modem, and the like. The communication section 809 performs communication processing via a network such as the Internet.

The driver 810 is also connected to the input/output interface 805 as required. A removable medium 811 such as a magnetic disk, an optical disk, a magneto-optical disk, a semiconductor memory, etc. is installed on the drive 810 as needed, so that a computer program read out therefrom is installed into the storage section 808 as needed.

In the case where the above-mentioned series of processing is realized by software, a program constituting the software is installed from a network such as the Internet or a storage medium such as a removable medium 811.

Those skilled in the art should understand that such a storage medium is not limited to the removable medium 811 shown in FIG. 8 in which the program is stored and distributed separately from the device to provide the program to the user. Examples of the removable medium 811 include a magnetic disk (including a floppy disk (registered trademark)), an optical disk (including a compact disk read-only memory (CD-ROM) and a digital versatile disk (DVD)), and a magneto-optical disk (including a mini disk (MD) (registered trademark)) and semiconductor memory. Alternatively, the storage medium may be a ROM 802, a hard disk included in the storage section 808, and the like, in which programs are stored, and are distributed to users together with a device containing them.

The preferred embodiments of the present disclosure have been described above with reference to the accompanying drawings, but the present disclosure is of course not limited to the above examples. Those skilled in the art may find various alternations and modifications within the scope of the appended claims, and it should be understood that they naturally fall within the technical scope of the present disclosure.

For example, multiple functions included in one unit in the above embodiments may be implemented by separate apparatus. Alternatively, multiple functions implemented by multiple units in the above embodiments may be implemented by separate apparatus, respectively. In addition, one of the above functions may be implemented by multiple units. Apparently, such a configuration falls within the technical scope of the present disclosure.

In this specification, the steps described in the flowchart include not only processes performed in time series in the described order, but also processes performed in parallel or individually instead of having to be performed in time series. Further, even in the steps processed in a time series, the order can be appropriately changed.

In addition, the technology according to the present disclosure can also be configured as follows.

An information processing apparatus includes a classification loss calculating unit configured to input each sample image in a training set into at least two feature extracting components to obtain at least two features of the sample image, and to cause a classifying component to calculate a classification loss of the sample image based on the at least two features; a sample pair extracting unit configured to extract, from each pair of features among at least one pair of features among the at least two features, a plurality of sample pairs for calculating mutual information between the each pair of features; an information loss calculating unit configured to input the plurality of sample pairs into a machine learning architecture corresponding to the each pair of features, to calculate an information loss between the each pair of features; and a joint training unit configured to jointly adjust parameters of the at least two feature extracting components, the classifying component and the machine learning architecture by minimizing the sum of the classification losses and the information losses of all sample images in the training set, to obtain the at least two feature extracting components and the classifying component having been trained.

The sample pair extracting unit is configured to transform a feature with less information in the each pair of features to have the same size as a feature with more information in the each pair of features, to take a sample pair extracted from the same positions in each pair of features having been transformed as a positive sample pair for representing that the mutual information is larger than a predetermined threshold, and to take a sample pair extracted from different positions as a negative sample pair for representing that the mutual information is smaller than or equal to a predetermined threshold, and the plurality of sample pairs comprise a plurality of the positive sample pairs and a plurality of the negative sample pairs.

According to an aspect of an embodiment, the sample pair extracting unit is configured to perform the transforming on the feature with less information by upsampling.

According to an aspect of an embodiment, the at least one pair of features comprises one pair of features extracted by two adjacent feature extracting components among the least two feature extracting components.

According to an aspect of an embodiment, each feature among the at least two features is a three-dimensional feature.

The machine learning architecture is a neural network architecture.

According to an aspect of an embodiment, the feature extracting components are convolutional layers of a convolutional neural network.

According to an aspect of an embodiment, the classifying component calculates, as the classification loss, a softmax loss based on the at least two features.

An information processing apparatus includes the at least two feature extracting components and the classifying component having been trained which are obtained by the information processing apparatus, wherein the at least two feature extracting components having been trained are configured to extract features from an image to be classified; and the classifying component having been trained is configured to classify, based on the features, the image to be classified.

An information processing apparatus includes a sample pair extracting unit configured to extract, from each pair of features among at least one pair of features among at least two features of a training sample image which are obtained by a classifying device having been trained, a plurality of sample pairs for calculating mutual information between the each pair of features; an information loss calculating unit configured to input the plurality of sample pairs into a machine learning architecture corresponding to the each pair of features, to calculate an information loss between the each pair of features; a training unit configured to adjust parameters of the machine learning architecture by minimizing the sum of the information losses of all training sample images, to obtain the machine learning architecture having been trained; and a training task difficulty judging unit configured to calculate an information loss of each training sample image with the machine learning architecture having been trained, and to judge the difficulty of a training task based on a mean value of the information losses of all training sample images.

According to an aspect of an embodiment, the sample pair extracting unit is configured to transform a feature with less information in the each pair of features to have the same size as a feature with more information in the each pair of features, to take a sample pair extracted from the same positions in each pair of features having been transformed as a positive sample pair for representing that the mutual information is larger than a predetermined threshold, and to take a sample pair extracted from different positions as a negative sample pair for representing that the mutual information is smaller than or equal to a predetermined threshold, and the plurality of sample pairs comprise a plurality of the positive sample pairs and a plurality of the negative sample pairs.

According to an aspect of an embodiment, the sample pair extracting unit is configured to perform the transforming on the feature with less information by upsampling.

According to an aspect of an embodiment, the at least one pair of features includes adjacent features among the features obtained by the classifying device having been trained.

According to an aspect of an embodiment, each feature among the at least two features is a three-dimensional feature.

According to an aspect of an embodiment, the machine learning architecture is a neural network architecture.

The invention claimed is:

1. An information processing apparatus, comprising:
a processor coupled to a memory and configured to,
input each sample image of a plurality of sample images in a training set into at least two feature extracting components to obtain at least two features of the sample image, and to cause a classifying component to calculate a classification loss of the sample image based on the at least two features;
extract, from each pair of features among at least one pair of features among the at least two features, a plurality of sample pairs of features for calculating mutual information between the pair of features;
input the plurality of sample pairs of features into a machine learning architecture corresponding to the pair of features, to calculate an information loss between the pair of features; and
jointly adjust parameters of the at least two feature extracting components, the classifying component and the machine learning architecture by minimizing a sum of a plurality of classification losses and a plurality of information losses of the plurality of sample images in the training set, based upon the obtained at least two features of the sample image to calculate the plurality of classification losses and the plurality of information losses, to obtain the at least two feature extracting components and the classifying component having been trained.

2. The information processing apparatus according to claim 1, wherein the processor is further configured to,
transform a feature with less information in the pair of features to have a same size as a feature with more information in the pair of features, to take a sample pair extracted from same positions in a pair of features having been transformed as a positive sample pair for representing that the mutual information is larger than a determined threshold, and to take a sample pair extracted from different positions as a negative sample pair for representing that the mutual information is smaller than or equal to a determined threshold, and
the plurality of sample pairs comprise a plurality of the positive sample pairs and a plurality of the negative sample pairs.

3. The information processing apparatus according to claim 2, wherein the processor is further configured to,
perform the transforming on the feature with less information by upsampling.

4. The information processing apparatus according to claim 1, wherein the at least one pair of features comprises one pair of features extracted by two adjacent feature extracting components among the least two feature extracting components.

5. The information processing apparatus according to claim 1, wherein each feature among the at least two features is a three-dimensional feature.

6. The information processing apparatus according to claim 1, wherein the machine learning architecture is a neural network architecture.

7. The information processing apparatus according to claim 1, wherein the feature extracting components are convolutional layers of a convolutional neural network.

8. The information processing apparatus according to claim 1, wherein the classifying component calculates, as the classification loss, a softmax loss based on the at least two features.

9. An information processing device, comprising:
a processor coupled to a memory and configured to,
utilize at least two feature extracting components and a classifying component, which have been trained by a training process to,
input each sample image of a plurality of sample images in a training set into at least two feature extracting components to obtain at least two features of the sample image, and to cause a classifying component to calculate a classification loss of the sample image based on the at least two features,
extract, from each pair of features among at least one pair of features among the at least two features, a plurality of sample pairs of features for calculating mutual information between the pair of features,
input the plurality of sample pairs of features into a machine learning architecture corresponding to the pair of features, to calculate an information loss between the pair of features, and
jointly adjust parameters of the at least two feature extracting components, the classifying component and the machine learning architecture by minimizing a sum of a plurality of classification losses and a plurality of information losses of the plurality of sample images in the training set, based upon the obtained at least two features of the sample image to calculate the plurality of classification losses and information losses, to obtain the at least two feature extracting components and the classifying component having been trained;
wherein the processor in the information processing device is further configured to,
extract features from an image to be classified using the at least two feature extracting components having been trained; and
classify the image based on the extracted features using the classifying component having been trained.

10. The information processing device according to claim 9, wherein the training process is to,
transform a feature with less information in the pair of features to have a same size as a feature with more information in the pair of features, to take a sample pair extracted from same positions in a pair of features having been transformed as a positive sample pair for representing that the mutual information is larger than a determined threshold, and to take a sample pair extracted from different positions as a negative sample pair for representing that the mutual information is smaller than or equal to a determined threshold, and the plurality of sample pairs comprise a plurality of the positive sample pairs and a plurality of the negative sample pairs.

11. The information processing device according to claim 10, wherein the training process is to, perform the transforming on the feature with less information by upsampling.

12. The information processing device according to claim 9, wherein the at least one pair of features comprises one pair of features extracted by two adjacent feature extracting components among the least two feature extracting components.

13. The information processing device according to claim 9, wherein each feature among the at least two features is a three-dimensional feature.

14. The information processing device according to claim 9, wherein the machine learning architecture is a neural network architecture.

15. An information processing apparatus, comprising:
a processor coupled to a memory and configured to,
extract a plurality of sample pairs of features of a training sample image among a plurality of training sample images for calculating mutual information between a pair of features, from each pair of features among at least one pair of features among at least two features of the training sample image, the at least two features obtained by a classifying device having been trained;
input the plurality of sample pairs of features into a machine learning architecture corresponding to the pair of features, to calculate an information loss between the pair of features;
adjust parameters of the machine learning architecture by minimizing a sum of information losses of the plurality of training sample images, to obtain the machine learning architecture having been trained; and
calculate an information loss of each training sample image of the plurality of training sample images with the machine learning architecture having been trained, and to judge a difficulty of a training task based on a mean value of the information losses of the plurality of training sample images,
wherein the processor is further configured to transform a feature with less information in the pair of features to have a same size as a feature with more information in the pair of features, to take a sample pair extracted from same positions in a pair of features having been transformed as a positive sample pair for representing that the mutual information is larger than a determined threshold, and to take a sample pair extracted from different positions as a negative sample pair for representing that the mutual information is smaller than or equal to a determined threshold, and
the plurality of sample pairs comprise a plurality of the positive sample pairs and a plurality of the negative sample pairs.

16. The information processing apparatus according to claim 15, wherein the processor is further configured to perform the transforming on the feature with less information by upsampling.

17. The information processing apparatus according to claim 15, wherein the at least one pair of features includes adjacent features among the features obtained by the classifying device having been trained.

18. The information processing apparatus according to claim 15, wherein each feature among the at least two features is a three-dimensional feature.

19. The information processing apparatus according to claim 15, wherein the machine learning architecture is a neural network architecture.

* * * * *